United States Patent

Rupp

Patent Number: 5,112,135
Date of Patent: May 12, 1992

[54] MIXER

[76] Inventor: Carl A. Rupp, 2382 S. Redwood Rd., Salt Lake City, Utah 84119

[21] Appl. No.: 543,104

[22] Filed: Jun. 25, 1990

[51] Int. Cl.$^5$ .............................................. B01F 7/16
[52] U.S. Cl. .................. 366/197; 366/343; 366/344; 366/331; 403/290; 403/354
[58] Field of Search ............ 366/197, 206, 279, 343, 366/342, 201, 331, 344; 403/290, 354

[56] References Cited

U.S. PATENT DOCUMENTS

| | | | |
|---|---|---|---|
| 377,064 | 1/1888 | Clark | 366/197 |
| 414,566 | 11/1889 | Nelleson | 366/197 |
| 605,498 | 6/1898 | Michaelson | 403/290 X |
| 1,072,378 | 9/1913 | Bauschlicher | 403/290 X |
| 1,134,179 | 4/1915 | Boyd | 403/354 |
| 1,463,736 | 7/1923 | Ward | 366/197 X |
| 1,592,788 | 7/1926 | Supervielle | 366/138 |
| 1,792,363 | 2/1931 | Dehuff | 403/354 X |
| 1,898,946 | 2/1933 | Fitzgerald | 366/207 |
| 2,007,299 | 7/1935 | Gilbert et al. | 366/197 |
| 2,060,523 | 11/1936 | Packer | 366/199 X |
| 2,061,868 | 11/1936 | Fitzgerald | 366/201 |
| 2,658,642 | 11/1953 | Casella | 366/197 X |
| 2,692,854 | 10/1954 | Henley | 366/331 X |
| 2,847,198 | 8/1958 | Smith | 366/331 X |
| 2,910,277 | 10/1959 | Brown | 366/197 |
| 3,619,754 | 11/1971 | Fuchs | 366/331 X |
| 4,822,175 | 4/1989 | Barnard et al. | 366/206 X |
| 4,936,688 | 6/1990 | Cornell | 366/197 |

*Primary Examiner*—Frankie L. Stinson
*Attorney, Agent, or Firm*—M. Reid Russell

[57] ABSTRACT

A mixer that includes separate connectable motor and mixing housings, which motor housing includes an electric motor that turns an output shaft that extends into the mixing housing. The mixing housing is open to admit a cup containing a material for mixing, which mixing is accomplished by turning the motor output shaft whereto the handle end of a spoon is releasable mounted. The spoon head end is for turning in the material, which spoon mounting is a longitudinal slot in the output shaft end to accommodate the spoon handle end fitted therein and a close fitting resilient sleeve telescoped over that output shaft end, the resilient sleeve interior adhering to the spoon handle edges.

5 Claims, 2 Drawing Sheets

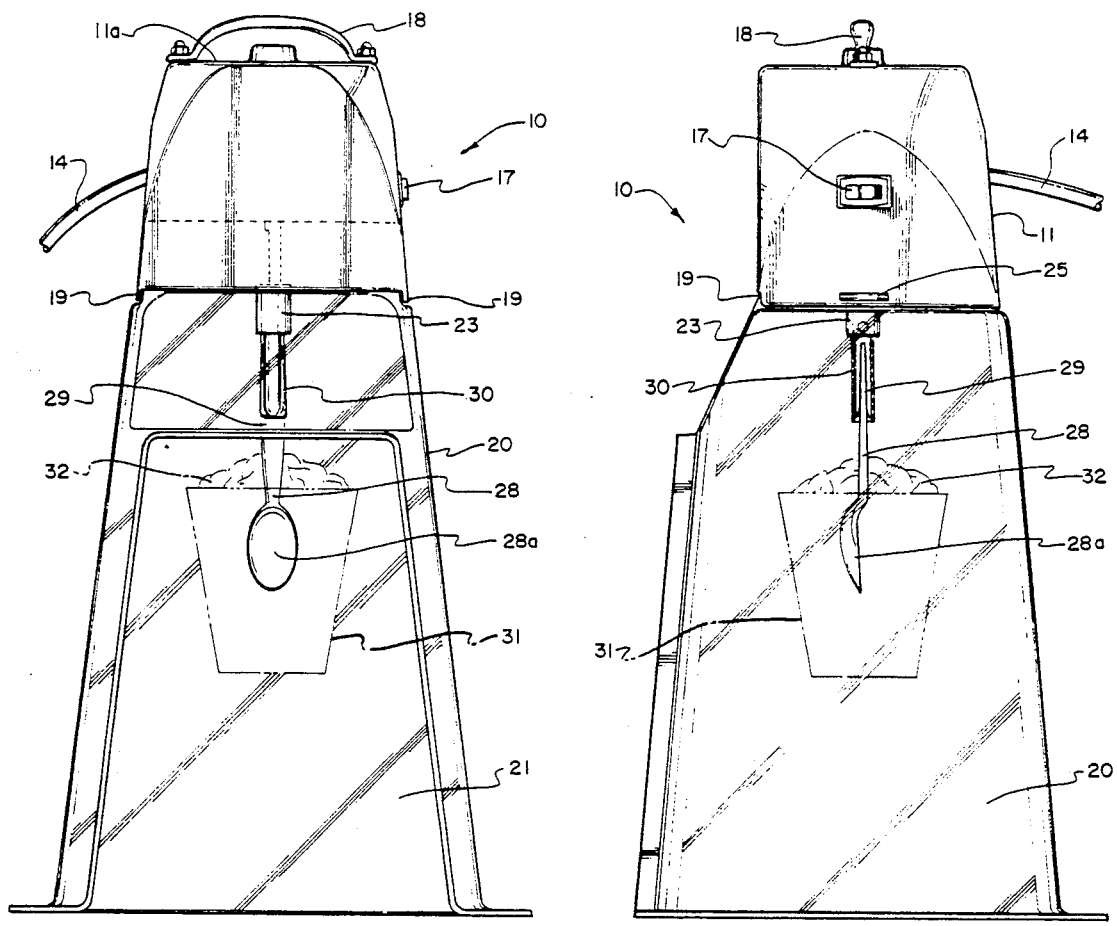
FIG. 3
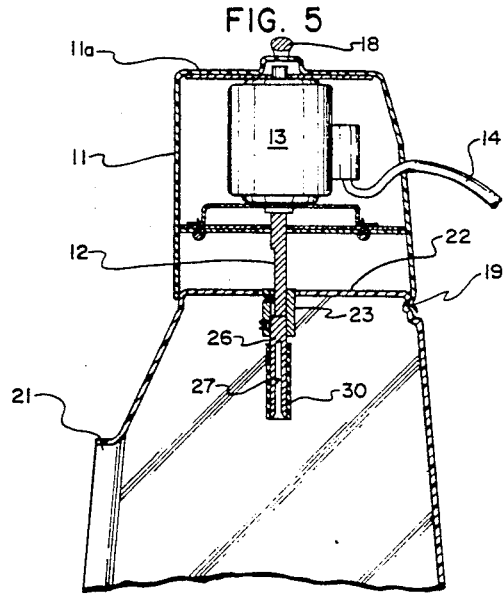
FIG. 5
FIG. 4

MIXER

BACKGROUND OF THE INVENTION

1. Field of the Invention

This invention relates to mixers or stirs for mixing a syrup or the like into a thickened material such as a malt or shake.

2. Prior Art

Electric motor operated mixers that turn a blade positioned within a shake or malt material to mix something into that material are not new, and such have been available for a number of years. With such mixers however, the blades thereof have to be cleaned or at least washed off between uses to avoid contamination of the materials being mixed. Further using such mixers requires the close attention of the operator to avoid spillage and slinging of the materials being mixed onto walls and areas surrounding such mixer.

Rather than a turning blade as provided in earlier mixers the present invention provides a removable spoon for turning in the thickened material that is then separated from the mixture and left within the stirred material and accordingly, there is no blade component of the present mixer that requires cleaning between uses. Further, the spoon is arranged to turn within a transparent housing, that allows the operation to observe and control positioning of a container of materials relative to the turning spoon eliminating materials being thrown out of the container into the surrounding area.

SUMMARY OF THE INVENTION

It is a principal object of the present object to provide a mixer that is arranged to utilize a conventional plastic or other flexible spoon as the mixer stirring or mixing blade.

Another object of the present invention is to provide a mixer where the blade is a resilient spoon that is easily removable to be left in the thickened material after it is mixed.

Still another object of the invention is to provide an electric motor operated mixer that is controlled by an operator through a switch where the area of mixing is enclosed so as to avoid splashing materials being mixed onto the operator and the surrounding area.

Still another object of the present invention is to provide a mixer that is inexpensive to produce and requires little to no cleaning between usages, and that is safe and reliable to operate.

The mixer of the present invention includes an electric motor contained in a housing that is mounted to the top of a flared skirt housing. The skirt housing is preferably formed of a clear material and has four sides one of which is open to allow an operator to manually pass a malt or shake cup therethrough that is maintained and mixed within that skirt housing by an operator. Mixing is provided by turning a plastic spoon that is axially coupled to the motor drive shaft. Which spoon head end functions as the mixing paddle when turned within the thick material to mix a flavoring or the like therein. Coupling of the spoon is to the spoon shank or handle end that is fitted into a slot between sides of a split motor output shaft and is held therein by a flexible resilient sleeve that is fitted over the slotted shaft end. The spoon edges adhere to the flexible sleeve inner wall and is pulled therefrom and pulled from its shaft coupling by the operator and left in the mixed material. The spoon is selected to have sufficient resilience to allow it to twist without breaking when a torsional force is applied thereto.

The mixer is preferably operated through a foot switch that is controlled by an operator who inserts the cup containing thickened material, usually a malt, shake or soft serve ice cream or yogurt, through the open portion of the skirted housing, and elevates the cup such that the spoon passes into the shake or malt. The mixer is then operated by the operator depressing the foot switch to turn the spoon so as to mix materials into that shake or malt.

DESCRIPTION OF THE DRAWINGS

In the drawings that illustrate that which is present and regarded as being the best mode of the invention:

FIG. 3, shows a front elevation view of the mixer of FIG. 1, with a cup containing a stiff mixture shown supported therein and with the spoon wide blade end installed into that stiff mixture;

FIG. 4, shows a partial side elevation sectional view taken on the line 4—4 of FIG. 1, showing the motor in the motor housing, the motor output shaft and coupling end and with the flexible elastic tube shown telescoped thereover; and FIG. 5, is a side elevation view of the mixer of FIG. 1.

DETAILED DESCRIPTION OF THE INVENTION

Figure 1:
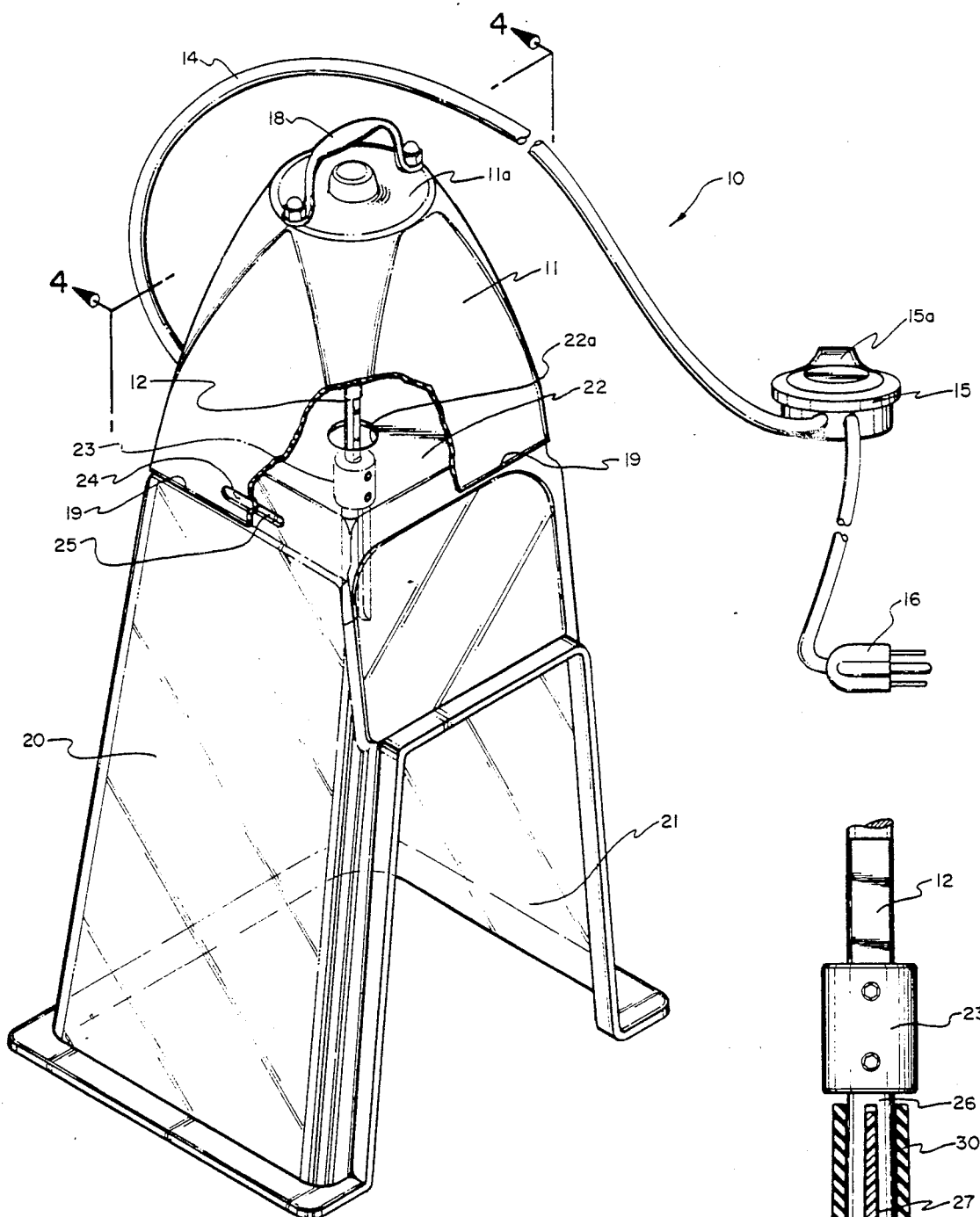
FIG. 1 is a side elevation perspective view of the invention in the mixer showing a section of a motor housing broken away to expose the end of the motor and its drive shaft and showing an electrical cord connected to the motor through a foot switch.

The present invention in a mixer 10 is shown in the perspective view of FIG. 1 and in the front and side elevation views of FIGS. 3 and 5. FIG. 1 shows an upper or motor housing 11 that has a corner partially broken-away to expose an end of output shaft 12 of electric motor 13, that is shown also in FIG. 4. The electric motor 13 is connected to receive power through a cord 14, that as shown best in FIG. 1, connects through a switch 15, and has a plug end 16 for fitting into a conventional electrical receptacle. With plug end 16 connected into a receptacle, an operator, by depressing a foot switch 15a portion of a switch 15 operates the motor 13 that turns the output shaft 12. In FIG. 5, a switch 17 is shown on the side of the mixer. Which switch 17 is manually depressed to enable motor 13 operation when the foot switch 15a portion of switch 15 is depressed. Accordingly, switch 17 is an override control for the motor 13.

Motor housing 11 is shown to have outwardly sloping sides from a rounded head end, tapering from a flat apex 11a whereacross a handle 18 is attached. The lower edges of which motor housing 11 sloping sides are formed into flanges 19. The flange sides of the motor housing extend downwardly to slide over a head end 22 of a mixing housing formed of rear and side walls 20, which front wall that is open at 21, as shown best in FIG. 1. The mixing housing's three sides 20 slope outwardly from the closed head end 22 and the housing is open across its front portion 21. Through front portion 21 as shown in FIGS. 3 and 4, a cup is fitted and is maintained in the mixing housing by an operator, who holds the cup as set out hereinbelow. A center opening 22a is provided through mixing housing head end 22 as shown best in FIG. 1, wherethrough the motor output shaft 12 is fitted.

The motor housing 11 is for mounting across the mixing housing head end 22 between sides 20 and is preferably maintained thereto by fitting interiorly facing longitudinal ridges 24, that are formed on opposite flanges 19 into slots 25 that are formed in opposite sides 20, adjacent to the head end 22, as shown best in FIG. 1. The ridges 24, when fitted into the slots 25, provide a releasable locking of the motor housing 11 thereto that can be easily removed by tilting the one edge of the motor housing around its opposite edge, the ridges 24 sliding out of slots 25.

With the motor housing mounted to the mixing housing, as shown, the motor output shaft 12 extends into the mixing housing and includes a coupling 23 secured axially to the end thereof as by turning set screws or the like, of that coupling. Which coupling 23, as shown best in FIG. 2, connects axially on its other end to a solid end of a slotted spoon mount 26. Which slotted spoon mount 26 has a center longitudinal slot 27 that is formed therein between equally parallel sides, the slot to receive a handle end 29 of a spoon 28 fitted therein that is to function as a mixing blade. The spoon 28 should be taken as being a conventional plastic spoon that is formed from a resilient plastic material such that, when a torsional force is exerted thereon, the spoon will tend to twist rather than break. A spoon manufactured by James River Corp., known as a Dixie Medium Weight Teaspoon, TMP 21, has been found in practice to have the desired resilient characteristics to be suitable for use as spoon 28.

Figure 2:
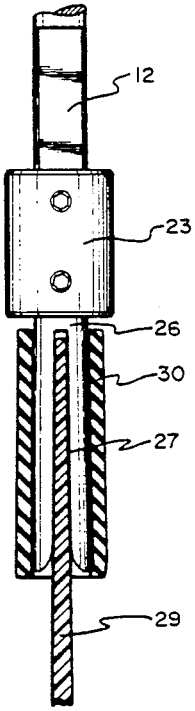
FIG. 2, is a view showing the motor drive shaft end that is splint to axially receive an end of a spoon handle inserted therein and showing a flexible resilient sleeve fitted thereover.

The spoon handle end 29, as shown best in FIG. 2, is fitted into the spoon mount slot 27 and is held therein by adherence to the interior wall of a close fitting resilient sleeve 30 that is telescoped over the slotted spoon mount 26, and contacts the edges of the spoon handle 29. So arranged, the spoon can be easily installed into the slot 27, the operator sliding it therein and removed therefrom by an operator pulling that spoon out of the slotted spoon mount, overcoming the adhesive engagement of the spoon end edges to the resilient sleeve 30 interior wall.

Mixer 10 operation is illustrated best in FIGS. 3 and 5, as involving an operator, not shown, who manually holds a cup 31 that contains a stiff mixture 32, such as a malt, shake or soft service ice cream or yogurt. That operator passes the cup through the front opening 21 of the mixing housing, and then lifts the cup to where a broad head end 28a of a spoon 28 and a portion of the spoon handle 29 are positioned in that stiff mixture 32. So arranged, the motor is operated by depressing the foot switch 15a, turning the output shaft 12 and the spoon 28 within the mix so as to provide a mixing action to that stiff mixture 32. Which stiff mixture 32 has before mixing received a flavoring poured thereon or other additives such as nuts, pieces of candy, raisins, or the like, the spoon turning provides a thorough mixing of that stiff mixture 32. Such mixing is observed by an operator looking through the mixing housing open front and sides 20. After mixing, the operator removes the cup with one hand and grasps the spoon handle end 29 with his other hand and pulls it downwardly until it disengages from its mounting in slot 27 of the slotted spoon mount at 26. The spoon is left in the mix 32 when the cup of mixed material 31 is handed to a purchaser. While not shown, it should be understood that a platform could be included within the mixing housing for supporting the cup 31 bottom resting thereon.

While the arrangement of the mixing mounting with three clear sides 20 and an open front 21, the motor housing 11, and their coupling arrangement have been shown herein as preferred, it should be understood that they could both or individually be otherwise configured, as appropriate so long as access is provided for fitting a cup of mixture into engagement with the spoon 28. Also, it should be understood that any convenient size of plastic spoon 28 appropriate for the function described can be utilized within the scope of this disclosure. Further, while the switch 17 and the foot switch 15 are shown herein, it should be understood that one switch only can be utilized for operating motor 13.

While a preferred embodiment of the present invention in a mixer has been shown and described herein, it should be understood that the present disclosure is made by way of example only and that variations and changes thereto ar possible without departing from the subject matter and reasonable equivalency thereof coming within the scope of the following claims, which claims I regard as my invention.

I claim:

1. A mixer comprising, a housing arranged to admit a cup of material to be mixed; an electric motor arranged in said housing that includes an output shaft; switch means for operating said electric motor; quick release means for releasable mounting a handle end of a spoon to said motor output shaft consisting of a spoon mount that is mounted axially to the end of said output shaft, the opposite spoon mount end slotted longitudinally to receive said spoon handle end that closely fits between opposing faces of said longitudinal slot; and a resilient tube means that is telescoped in close fitting relationship over said spoon mount, the inner surface of said resilient tube means for closely fitting to the handle edges of said spoon so as to provide a friction engagement with said spoon handle edges.

2. A mixer as recited in claim 1, wherein the housing is arranged as separate motor and mixing housings, and said motor housing is arranged for releasable mounting to a head end of said mixing housing.

3. A mixer as recited in claim 2, wherein the output shaft of said electric motor extends through the head end of the mixing housing; and a coupling is arranged between said output shaft and the spoon mount.

4. A mixer as recited in claim 1, wherein the spoon is manufactured from plastic.

5. A mixer as recited in claim 4, wherein the spoon is a plastic spoon having a resilient characteristic.

* * * * *